United States Patent
Gustof et al.

(10) Patent No.: US 12,081,556 B2
(45) Date of Patent: Sep. 3, 2024

(54) DEVICE, SYSTEM AND METHOD FOR CHANGING COMMUNICATION INFRASTRUCTURES BASED ON CALL SECURITY LEVEL

(71) Applicant: MOTOROLA SOLUTIONS, INC., Chicago, IL (US)

(72) Inventors: Grzegorz Gustof, Cracow (PL); Piotr Furman, Cracow (PL); Wojciech Wojcik, Cracow (PL)

(73) Assignee: MOTOROLA SOLUTIONS, INC., Chicago, IL (US)

(*) Notice: Subject to any disclaimer, the term of this patent is extended or adjusted under 35 U.S.C. 154(b) by 209 days.

(21) Appl. No.: 17/797,988

(22) PCT Filed: Feb. 21, 2020

(86) PCT No.: PCT/PL2020/050018
§ 371 (c)(1),
(2) Date: Aug. 5, 2022

(87) PCT Pub. No.: WO2021/167472
PCT Pub. Date: Aug. 26, 2021

(65) Prior Publication Data
US 2023/0042020 A1    Feb. 9, 2023

(51) Int. Cl.
*H04L 9/40* (2022.01)
*H04M 3/22* (2006.01)
*H04M 3/42* (2006.01)

(52) U.S. Cl.
CPC ........ *H04L 63/105* (2013.01); *H04M 3/2218* (2013.01); *H04M 3/42068* (2013.01); *H04M 2201/40* (2013.01); *H04M 2203/158* (2013.01)

(58) Field of Classification Search
CPC .............. H04L 63/105; H04L 63/0861; H04M 3/2218; H04M 3/42068; H04M 3/436;
(Continued)

(56) References Cited

U.S. PATENT DOCUMENTS 8,015,403 B2 * 9/2011 FitzGerald ............ H04L 63/105
713/153
8,683,547 B2 * 3/2014 Apparao ................. H04L 63/20
709/224

(Continued)

OTHER PUBLICATIONS

Punte, Guus, Examiner, "International Search Report" mailed Oct. 23, 2020, issued in the corresponding PCT Application No. PCT/PL2020/050018, filed Feb. 21, 2020.

*Primary Examiner* — Samson B Lemma
(74) *Attorney, Agent, or Firm* — PERRY +CURRIER, INC.

(57) ABSTRACT

A device, method and system for changing communication infrastructure based on call security level is provided. A device determines a call security level of a call occurring at a first communication infrastructure; the first communication infrastructure associated with a first security level; the call security level determined from one or more of; a profile of a caller on the call; and audio on the call. In response to determining that the call security level and the first security level are misaligned, the device causes the call to change to a second communication infrastructure associated with a second security level aligned with the call security level.

18 Claims, 7 Drawing Sheets

(58) Field of Classification Search
CPC ............. H04M 3/56; H04M 2203/158; H04M 2203/6009; H04M 2203/609
USPC .......................................................... 726/4
See application file for complete search history.

(56) References Cited

U.S. PATENT DOCUMENTS

| | | | |
|---|---|---|---|
| 9,009,785 B2* | 4/2015 | Apparao | H04L 63/105 |
| | | | 713/188 |
| 9,736,252 B2 | 8/2017 | Ferris et al. | |
| 2010/0299724 A1* | 11/2010 | Masiyowski | H04L 63/105 |
| | | | 709/228 |
| 2011/0099602 A1* | 4/2011 | Apparao | G06Q 10/06 |
| | | | 726/1 |
| 2012/0230480 A1* | 9/2012 | Coppage | H04L 65/1095 |
| | | | 379/93.02 |
| 2015/0065087 A1* | 3/2015 | Cudak | H04W 12/08 |
| | | | 455/411 |
| 2015/0172204 A1 | 6/2015 | Anderson et al. | |
| 2016/0316401 A1* | 10/2016 | Adderly | H04W 36/302 |
| 2017/0104755 A1 | 4/2017 | Arregoces et al. | |
| 2018/0239911 A1 | 8/2018 | Breuer et al. | |

* cited by examiner

US 12,081,556 B2

DEVICE, SYSTEM AND METHOD FOR CHANGING COMMUNICATION INFRASTRUCTURES BASED ON CALL SECURITY LEVEL

BACKGROUND OF THE INVENTION

Call processing may occur at cloud communication infrastructure or at on-premises communication infrastructure. When a call occurs between various types of security personnel and/or public safety personnel, and the like, the call is generally conducted at a given communication infrastructure which may not have a suitable security level for the call.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
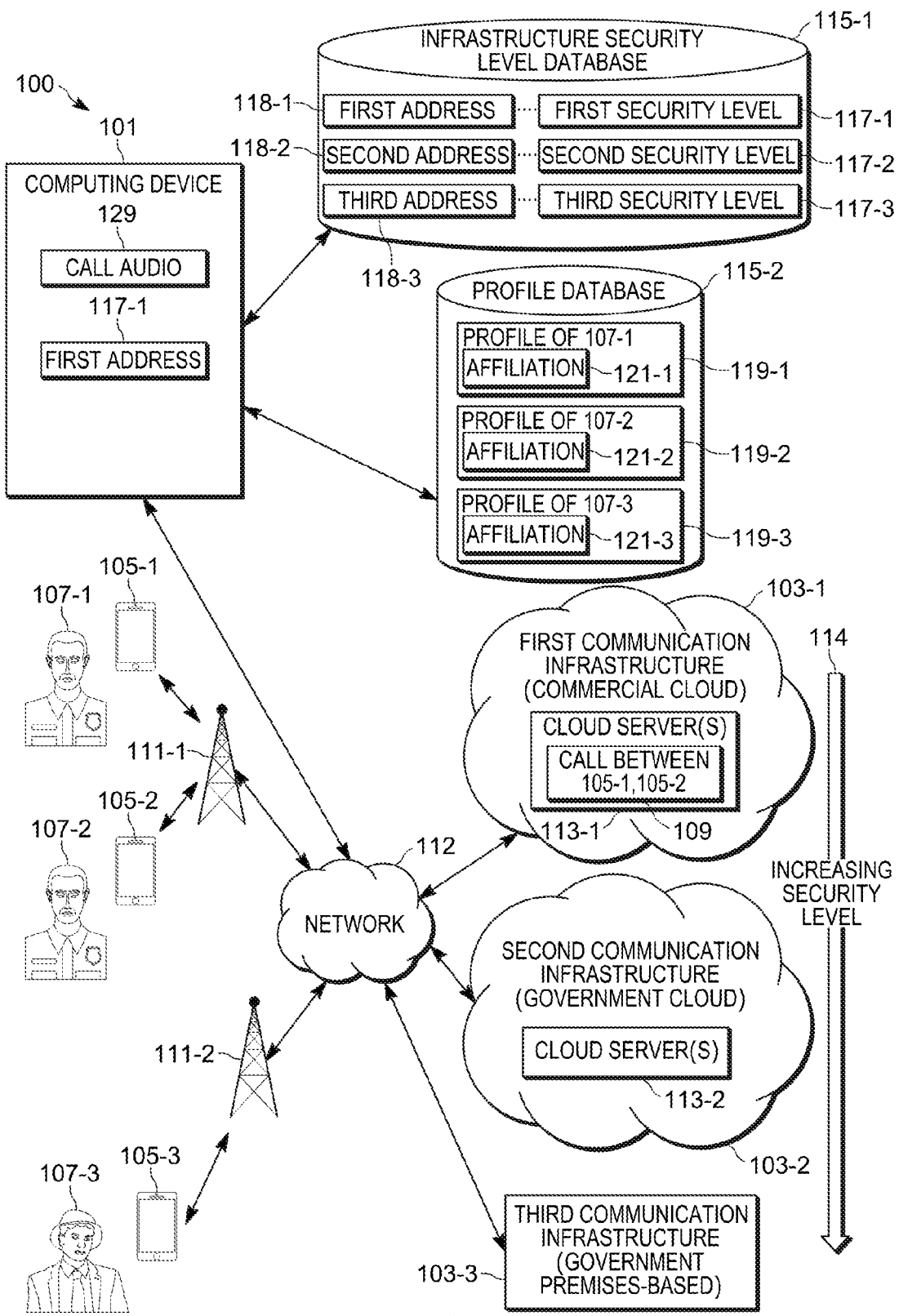
FIG. 1 is a system for changing communication infrastructure based on call security level, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Call processing may occur at cloud communication infrastructure or at on-premises communication infrastructure. When a call occurs between various types of security personnel and/or public safety personnel, and the like, the call is generally conducted at a given communication infrastructure which may not have a suitable security level for the call. For example, commercial communication infrastructure, which may be in the cloud, may be more easily hacked than government communication infrastructure and/or premises based communication infrastructure. Put another way, commercial communication infrastructure may have less security measures and/or equipment in place than government communication infrastructure. Hence, when the call is conducted at commercial communication infrastructure, for example, and the security personnel and/or public safety personnel discuss sensitive and/or confidential topics, the commercial communication infrastructure may not be suitable for discussing such sensitive and/or confidential topics. Similarly, when one or more of the security personnel and/or public safety personnel on the call belong to a government agency, and the like, that requires that calls in which their employees participate be conducted at communication infrastructure that has a given security level (e.g. a given certified security classification), the commercial communication infrastructure may not meet the security level requirements of the government agency.

Hence, provided herein, is a computing device that determines a call security level of a call occurring at a first communication infrastructure. For example, the computing device may be located at a base station that transmits and receives audio on the call to one or more devices being used to conduct the call, and/or the computing device may be located in the cloud (e.g. the computing device may comprise a cloud computing device). Regardless of location, the computing device may be configured to monitor audio on the call and/or have access to a profile of one or more callers on the call which may indicate an agency with which they are associated. The computing device generally determines the call security level from one or more of; a profile of a caller on the call; and audio on the call. Furthermore, the first communication infrastructure may generally be associated with a first security level. The computing device may further compare a determined call security level of the call with the first security level of the first communication infrastructure at which the call is being conducted. In response to determining that the call security level and the first security level are misaligned, the computing device may cause the call to change to a second communication infrastructure associated with a second security level aligned with the call security level. Such a change may be to a second communication infrastructure that has a higher or lower level security level than the first security level of the first communication infrastructure at which the call is initially conducted, depending on the determined call security level compared to the first security level of the first communication infrastructure at which the call is being conducted.

For example, the determined call security level may be relatively high, as compared to the first security level of the first communication infrastructure at which the call is initially conducted, and hence the computing device may cause the call to change to a second communication infrastructure associated with a second security level higher than the first security level, and aligned with the call security level.

However, the determined call security level may be relatively low, as compared to the first security level of the first communication infrastructure at which the call is initially conducted, and hence the computing device may cause the call to change to a second communication infrastructure associated with a second security level lower than the first security level, and aligned with the call security level.

Furthermore, the computing device may continue to determine a call security level of the call and, as a current call security level increases or decreases, cause the call to change to another communication infrastructure having a respective security level aligned with a current call security level. Indeed, communication infrastructures with relatively high security levels may have a relatively high call processing cost; hence, changing to a lower security level when the call security level decreases may save cost for the call.

An aspect of the specification provides a method comprising: determining, at a computing device, a call security level of a call occurring at a first communication infrastructure; the first communication infrastructure associated with a first security level; the call security level determined from one or more of: a profile of a caller on the call; and audio on the call; and in response to determining that the call security level and the first security level are misaligned, causing, via the computing device, the call to change to a second communication infrastructure associated with a second security level aligned with the call security level.

Another aspect of the specification provides a device comprising: a communication unit; and a controller configured to: determine, via the communication unit, a call security level of a call occurring at a first communication infrastructure; the first communication infrastructure associated with a first security level; the call security level determined from one or more of: a profile of a caller on the call; and audio on the call; and in response to determining that the call security level and the first security level are misaligned, cause, via the communication unit, the call to change to a second communication infrastructure associated with a second security level aligned with the call security level.

Attention is directed to FIG. 1, which depicts an example system 100 for changing communication infrastructure based on call security level. The system 100 comprises a computing device 101, and a plurality of communication infrastructures 103-1, 103-2, 103-3, each of the plurality of communication infrastructures 103-1, 103-2, 103-3 configured to process and/or conduct and/or manage a call between communication devices. For example, as depicted, the system 100 further comprises a plurality of communication devices 105-1, 105-2, 105-3, each operated by and/or associated with a respective user and/or caller 107-1, 107-2, 107-3. As depicted the devices 105-1, 105-2 are initially conducting a call 109 that is being processed and/or conducted and/or managed at a first communication infrastructure 103-1. In particular, the system 100 further comprises base stations 111-1, 111-2, and the devices 105-1, 105-2 are in communication with the first communication infrastructure 103-1 via the base station 111-1 and a communication network 112 (e.g. also referred to herein as the network 112) via respective communication links therebetween. Put another way, the base station 111-1 routes communications to and from the devices 105-1, 105-2 to a network address associated with the first communication infrastructure 103-1, as described in more detail below.

Indeed, the various devices and/or components of the system 100 are in communication via any suitable number of communication links (e.g. depicted as a double-ended arrow between devices and/or components of the system 100), and the communication links may comprise any suitable number of wired and/or wireless communication links, any suitable number of wired and/or wired communication networks, and the like including, but not limited to, the network 112.

As depicted, the first communication infrastructure 103-1 and a second communication infrastructure 103-2 comprise respective cloud computing communication infrastructures. In particular, as depicted, the first communication infrastructure 103-1 comprises a commercial cloud computing infrastructure that includes at least one cloud server 113-1 at which the call 109 is being conducted. For example, the first communication infrastructure 103-1 may be operated by a commercial entity and/or agency, such as a telephone company, and the like. In some examples, such a commercial entity and/or agency may be contracted by a public-safety and/or government agency to process and/or conduct call between employees thereof; in some examples, such a public-safety agency and/or government agency may comprise a city police agency and the callers 107-1, 107-2 may be employees thereof (e.g. the callers 107-1, 107-2 may be city police officers, detectives, and the like).

Alternatively, such a commercial entity and/or agency may be contracted by a private security agency to process and/or conduct call between employees thereof; in some examples, such a private security agency may comprise a security company that manages security for privately owned buildings, and the callers 107-1, 107-2 may be employees thereof (e.g. the callers 107-1, 107-2 may be security guards).

As depicted, the second communication infrastructure 103-2 comprises a government and/or public-safety based cloud computing infrastructure that includes at least one cloud server 113-2. For example, the second communication infrastructure 103-2 may be operated by, and/or associated with, a government and/or public-safety agency, such as a state and/or federal police force, and the like. However, the second communication infrastructure 103-2 may also be operated by a commercial entity and/or agency, contracted by the government and/or public-safety agency to process and/or conduct call between employees thereof, however to higher level of security than the first communication infrastructure 103-1. As will be described below, the caller 107-3 may be employee of such a government and/or public-safety agency and/or state and/or federal police force, and the like. Furthermore, it is understood that when both the communication infrastructures 103-1, 103-2 are associated with government and/or public-safety agencies, the government and/or public-safety agency associated with the second communication infrastructure 103-2 may require a higher security level for communications with employees than the respective government and/or public-safety agency associated with the first communication infrastructure 103-1.

As depicted, a third communication infrastructure 103-3 comprises a premises-based infrastructure. For example, the third communication infrastructure 103-3 is not cloud based and may comprise a premises-based server operated by, and/or associated with, a government and/or public-safety agency, and/or located at government controlled location. In some examples, the third communication infrastructure 103-3 may be operated by the same government and/or public-safety agency that operates the second communication infrastructure 103-2, or a different government and/or public-safety agency. Similar to the communication infrastructures 103-1, 103-2, the third communication infrastructure 103-3 may also be operated by a commercial entity and/or agency, contracted by the government and/or public-safety agency to process and/or conduct call between employees thereof, however to higher level of security than the communication infrastructures 103-1, 103-2. Indeed, the same commercial entity and/or agency may operate all of the communication infrastructures 103-1, 103-2, 103-3, for example in a "multi-tenant system" environment, however, to varying degrees of security with, for example, the security level increasing from the first communication infrastructure 103-1 to the second communication infrastructure 103-2 to the third communication infrastructure 103-3, as indicated by an arrow 114, and described in more detail hereafter.

In particular, it is understood that a respective security level of each of the plurality of communication infrastructures 103-1, 103-2, 103-3 is different. For example, as depicted, a security level of the second communication infrastructure 103-2 is higher than a respective security level of the first communication infrastructure 103-1; in particular, as the second communication infrastructure 103-2 may be operated by, and/or associated with, certain government and/or public-safety agencies, the security systems and/or protocols and/or hardware thereof may be more secure than respective security systems and/or protocols and/or hardware of the first communication infrastructure 103-1 operated by a commercial entity. Similarly, as depicted, a security level of the third communication infrastructure 103-3 is higher than a respective security level of the second communication infrastructure 103-2; in particular, as the third communication infrastructure 103-3 is premises based, the security systems and/or protocols and/or hardware thereof may be more secure than respective security systems and/or protocols and/or hardware of the second communication infrastructure 103-2 which is cloud based. In other words, premises-based communication infrastructure may be more secure than cloud-based communication infrastructure, and cloud-based communication infrastructure operated by, and/or associated with, certain government and/or public safety entities is generally configured to be more secure than cloud-based communication infrastructure operated by commercial entities. For example, the various communication infrastructures 103-1, 103-2, 103-3 may be certified to different respective security levels and/or protocols and/or standards defined by standards bodies, with the security level increasing from the first communication infrastructure 103-1 to the second communication infrastructure 103-2 to the third communication infrastructure 103-3, as indicated by the arrow 114.

Regardless, a respective security level of plurality of communication infrastructures 103-1, 103-2, 103-3 may be stored at a memory and/or a database accessible to the computing device 101. For example, as depicted, the computing device 101 is in communication with one or more databases 115-1, 115-2; while the computing device 101 is depicted as being in communication with the one or more databases 115-1, 115-2 via communication links therebetween, the computing device 101 may be in communication with the one or more databases 115-1, 115-2 via the network 112.

As depicted, the database 115-1 comprises an infrastructure security level database, storing respective predetermined security levels 117-1, 117-2, 117-3 of the plurality of communication infrastructures 103-1, 103-2, 103-3. As depicted, the security levels 117-1, 117-2, 117-3 are stored in association with respective network addresses 118-1, 118-2, 118-3 of the communication infrastructures 103-1, 103-2, 103-3 (e.g. the association indicated by dashed lines between respective security levels 117-1, 117-2, 117-3 and network addresses 118-1, 118-2, 118-3). Such network addresses 118-1, 118-2, 118-3 may comprise respective internet protocol (IP) addresses of the communication infrastructures 103-1, 103-2, 103-3, and/or any suitable network address, which may be used by the base stations 111 used to route communications thereto.

The security levels 117-1, 117-2, 117-3 may comprise any suitable data indicating and/or defining the security levels of the plurality of communication infrastructures 103-1, 103-2, 103-3 including, but not limited to, a numeric indication of a respective security level of a communication infrastructures 103-1, 103-2, 103-3 (e.g. a numeric value and/or a range of numeric values), alphanumeric data indicative of a respective given security protocol and/or security standard met by a communication infrastructures 103-1, 103-2, 103-3, and/or under which a communication infrastructures 103-1, 103-2, 103-3 is operated, and the like. Regardless, a first security level 117-1 (e.g. of the first communication infrastructure 103-1) is understood to be lower than a second security level 117-2 (e.g. of the second communication infrastructure 103-2), and the second security level 117-2 (e.g. of the second communication infrastructure 103-2) is understood to be lower than a third security level 117-3 (e.g. of the third communication infrastructure 103-3). However, the terms "lower" and "higher" when used to compare the security levels 117-1, 117-2, 117-3 is not meant to imply that the security levels 117-1, 117-2, 117-3 are respective numbers which are lower or higher than each other; rather, as described above, the security levels 117-1, 117-2, 117-3 may comprise any suitable data indicative of respective security of the communication infrastructures 103-1, 103-2, 103-3 being lower or higher than each other, and/or worse or better than each other, including, but not limited to, the aforementioned alphanumeric data indicative of a respective given security standard met by the communication infrastructures 103-1, 103-2, 103-3.

As depicted, the database 115-2 comprises a profile database that stores one or more profiles of the callers 107-1, 107-2, 107-3. In particular, as depicted, the database 115-2 stores respective profiles 119-1, 119-2, 119-3 of the callers 107-1, 107-2, 107-3. The profiles 119-1, 119-2, 119-3 may include, but is not limited to, data indicative of a respective name, a respective rank, a respective affiliation, a respective security level, an associated respective communication infrastructure, an identifier of a respective communication device 105, and the like of the callers 107-1, 107-2, 107-3. In particular, as depicted, profiles 119-1, 119-2, 119-3 indicate respective affiliations 121-1, 121-2, 121-3 of the callers 107-1, 107-2, 107-3. For example, the affiliations 121-1, 121-2, 121-3 may comprise data indicative of a respective agency affiliation of the callers 107-1, 107-2, 107-3 and/or an agency and/or government affiliation of the callers 107-1, 107-2, 107-3. For example, the affiliation 121-3 of the caller 107-3, as indicated by the profile 119-3, may include data indicative of a government agency and/or public-service agency with which the caller 107-3 is associated and/or a government agency and/or a public-service agency that employs the caller 107-3. In some examples, the database 115-2 may be a component of one or more employee databases of the entities and/or agencies with which the callers 107-1, 107-2, 107-3 are associated.

Indeed, one or more of the databases 115-1, 115-2, as well as the computing device 101, may be maintained and/or operated by commercial entity contracted to manage communications in the system 100. For example, while the callers 107-1, 107-2, 107-3 may be associated with respective government agencies, such government agencies may have registered one or more of the callers 107-1, 107-2, 107-3 the devices 105-1, 105-2, 105-3 and/or the communication infrastructures 103-1, 103-2, 103-3 for use with the computing device 101, such that calls between one or more of the callers 107-1, 107-2, 107-3 may be managed by the computing device 101, as described below. Furthermore, the databases 115-1, 115-2 may be separate from one another (as depicted) or at partially combined.

For conciseness, hereafter, the plurality of communication infrastructures 103-1, 103-2, 103-3 will be interchangeably referred to hereafter, collectively, as the communication infrastructures 103 and, generically, as a communication infrastructure 103. Similarly, the communication devices 105-1, 105-2, 105-3 will be interchangeably referred to hereafter, collectively, as the communication devices 105 and, generically, as a communication device 105. Similarly, the callers 107-1, 107-2, 107-3 will be interchangeably referred to hereafter, collectively, as the callers 107 and, generically, as a caller 107. Similarly, the base stations 111-1, 111-2 will be interchangeably referred to hereafter, collectively, as the base stations 111 and, generically, as a base station 111. Similarly, the cloud servers 113-1, 113-2 will be interchangeably referred to hereafter, collectively, as the cloud servers 113 and, generically, as a cloud server 113. Similarly, the databases 115-1, 115-2 will be interchangeably referred to hereafter, collectively, as the databases 115 and, generically, as a database 115. Similarly, the security levels 117-1, 117-2, 117-3 will be interchangeably referred to hereafter, collectively, as the security levels 117 and, generically, as a security level 117. Similarly, the network addresses 118-1, 118-2, 118-3 will be interchangeably referred to hereafter, collectively, as the network addresses 118 and, generically, as a network address 118. Similarly, the profiles 119-1, 119-2, 119-3 will be interchangeably referred to hereafter, collectively, as the profiles 119 and, generically, as a profile 119. Similarly, the affiliations 121-1, 121-2, 121-3 will be interchangeably referred to hereafter, collectively, as the affiliations 121 and, generically, as an affiliations 121.

Furthermore, while present examples are described with respect two callers 107-1, 107-2 initially conducting a call 109 via the communication devices 105-1, 105-2, as well as one caller 107-3 who will later be added to the call 109, as described below, the system 100 may comprise any suitable number of callers associated with any suitable agencies and/or entities. Furthermore, the term "caller" may refer to any participant on a call that operates a communication device 105 to communicate on a call including, but not limited to, participants who initiate a call, participants who receive a call, participants who are conferenced into a call and/or added to a call, and the like.

Similarly, while three communication infrastructures 103 are depicted, the system 100 may comprise any suitable number of communication infrastructures 103 operated by, and/or associated with, any suitable agencies and/or entities including, but not limited to, at least two communication infrastructures 103 operated by commercial entities and/or government agencies, the at least two communication infrastructures 103 having different respective security levels 117.

Furthermore, the communication infrastructures 103-1, 103-2 may comprise any suitable combination of cloud-based servers, cloud-based switches, cloud-based devices, and the like, including, but not limited to, the cloud servers 113, for conducting a call in the cloud and/or in a distributed manner and/or over the Internet, and the like. Similarly, the communication infrastructure 103-3 may comprise any suitable combination of premises-based servers, premises-based switches, premises-based devices, and the like, for conducting a call at a defined premises and/or location.

While present examples are described with respect to the communication devices 105 comprising mobile devices using the base stations 111 to participate in calls, one or more of the communication devices 105 may comprise a land-line device, and the like, such as a public switched telephone network (PSTN) telephone.

Hence, the network 112 may comprise any suitable combination of mobile networks, wired networks, the Internet, the PSTN, and the like.

As will be described hereafter, the computing device 101 is generally configured to determine a call security level of a call (e.g. the call 109) and cause the call to change to a communication infrastructure aligned with the call security level, for example in response to determining that the call security level and a security level of current communication infrastructure are misaligned. Such misalignment is described in more detail below. In some examples, the computing device 101 is generally configured to determine a call security level of a call based on audio of the call, hence the computing device 101 may be configured to receive and/or monitor at least the audio of a call. As such, in FIG. 1, the computing device 101 is depicted as processing audio 129 of the call 109, as described in more detail below. However, in particular, the computing device 101 may have access to the audio 129 by way of the computing device 101 being located at one or more of the base stations 111 (e.g. via which the call 109 is relayed) and/or the computing device 101 may comprise a proxy device for one or more of the base stations 111 such that the call 109 and/or at least the audio 129 thereof, is copied to the computing device 101 and/or the call 109 and/or at least the audio 129 thereof is relayed via the computing device 101. The computing device 101 is further generally understood to have access to a network address 118 of a communication infrastructure 103 conducting a call, as well as respective network addresses 118 and communication infrastructures 103 to which a call may be moved and/or transferred.

Figure 2:
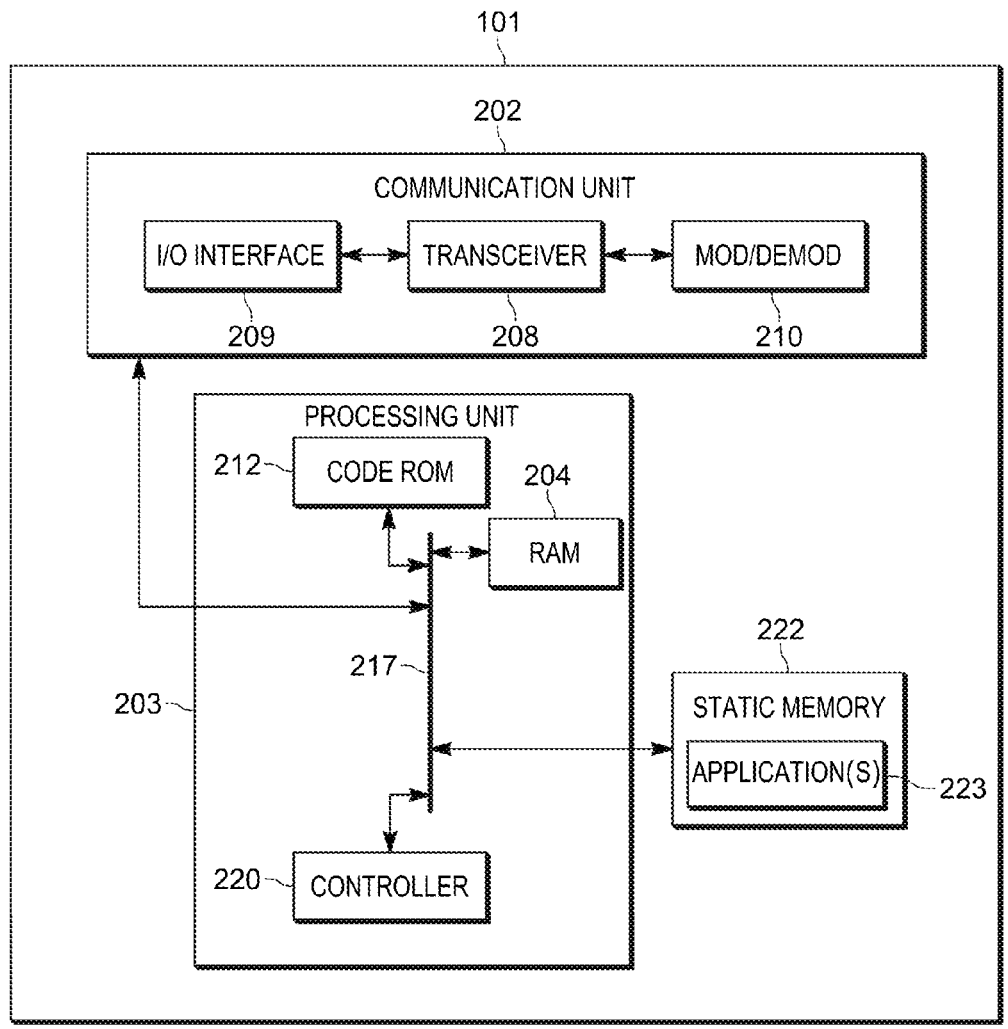
FIG. 2 is a device diagram showing a device structure of a computing device for changing communication infrastructure based on call security level, in accordance with some examples.

Attention is next directed to FIG. 2 which depicts a schematic block diagram of an example of the computing device 101. In general, the computing device 101 may comprise one or more servers and/or one or more cloud computing devices, and the like, configured to communicate with at least the base stations 111 and, optionally, one or more of the communication devices 105 on the call 109 and/or one or more of the communication infrastructures 103. However, in other examples, the computing device 101 may be located at one or more of the base stations 111 (e.g. in a distributed computing configuration) and/or a respective computing device 101 may be located at a given base station 111 (e.g. as a component of a base station controller and/or a base station unit and/or a radio network controller and/or, when a base station 111 is configured for LTE (Long-Term Evolution) communications, an eNode B device and/or an Enhanced Packet Core (EPC) device (e.g. which may control a plurality of the base stations 111 and/or eNode B devices). Regardless of location and/or configuration, the computing device 101 is generally configured to monitor a call (e.g. the call 109) and/or determine a call security level of a call.

As depicted, the computing device 101 comprises: a communication unit 202, a processing unit 203, a Random-Access Memory (RAM) 204, one or more wireless transceivers 208, one or more wired and/or wireless input/output (I/O) interfaces 209, a combined modulator/demodulator 210, a code Read Only Memory (ROM) 212, a common data and address bus 217, a controller 220, and a static memory 222 storing at least one application 223. Hereafter, the at least one application 223 will be interchangeably referred to as the application 223.

While not depicted, the computing device 101 may include one or more of an input device and a display screen and the like, a microphone (e.g. to receive voice commands) such that a user may interact with the computing device 101.

As shown in FIG. 2, the computing device 101 includes the communication unit 202 communicatively coupled to the common data and address bus 217 of the processing unit 203.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory 204 and the static memory 222.

The communication unit 202 may include one or more wired and/or wireless input/output (I/O) interfaces 209 which are configurable to communicate with at least the base stations 111 and, optionally, one or more of the communication devices 105 on the call 109 and/or one or more of the communication infrastructures 103. For example, the communication unit 202 may include one or more transceivers 208 and/or wireless transceivers for communicating with at least the base stations 111 and, optionally, one or more of the communication devices 105 on the call 109 and/or one or more of the communication infrastructures 103. Hence, the one or more transceivers 208 may be adapted for communication with one or more communication networks and/or communication links used to communicate with at least the base stations 111 and, optionally, one or more of the communication devices 105 on the call 109 and/or one or more of the communication infrastructures 103. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP (3rd Generation Partnership Project) networks, a 5G network (e.g. a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication unit 202 may optionally include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g. hardware ports) for coupling to other hardware components.

The controller 220 may include one or more logic circuits, one or more processors, one or more microprocessors, and/or the controller 220 may include one or more ASIC (application-specific integrated circuits) and one or more FPGA (field-programmable gate arrays), and/or another electronic device. In some examples, the controller 220 and/or the computing device 101 is not a generic controller and/or a generic device, but a device specifically configured to implement functionality for changing communication infrastructure based on call security level. For example, in some examples, the computing device 101 and/or the controller 220 specifically comprises a computer executable engine configured to implement functionality for changing communication infrastructure based on call security level.

The static memory 222 is a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the computing device 101 as described herein are maintained, persistently, at the memory 222 and used by the controller 220 which makes appropriate utilization of volatile storage during the execution of such programming instructions.

Figure 3:
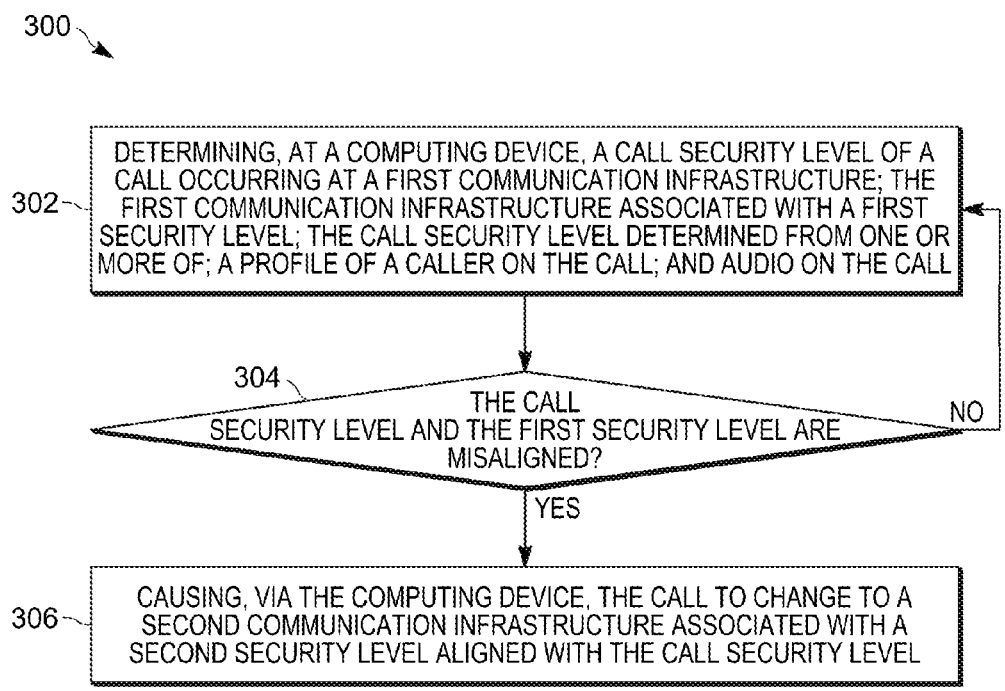
FIG. 3 is a flowchart of a method for changing communication infrastructure based on call security level, in accordance with some examples.

In particular, the memory 222 stores instructions corresponding to the at least one application 223 that, when executed by the controller 220, enables the controller 220 to implement functionality described herein including, but not limited to, the blocks of the method set forth in FIG. 3.

In illustrated examples, when the controller 220 executes the one or more applications 223, the controller 220 is enabled to: determine a call security level of a call occurring at a first communication infrastructure; the first communication infrastructure associated with a first security level; the call security level determined from one or more of; a profile of a caller on the call; and audio on the call; and in response to determining that the call security level and the first security level are misaligned, cause the call to change to a second communication infrastructure associated with a second security level aligned with the call security level.

The application 223 may include numerical algorithms configured to one or more of: determine a call security level of a call; determine whether the call security level aligns (and/or is misaligned) with a security level of a current communication infrastructure used to conduct the call; and determine a communication infrastructure to which the call is to be transferred to align call security level with a respective security level. Alternatively, and/or in addition to, the application 223 may include machine learning models and/or algorithms, and the like, which have been trained to one or more of: determine a call security level of a call; determine whether the call security level aligns (and/or is misaligned) with a security level of a current communication infrastructure used to conduct the call; and determine a communication infrastructure to which the call is to be transferred to align call security level with a respective security level.

For example, the application 223 may initially be operated by the controller 220 in a training mode to implement the functionality of the computing device 101 as described herein. In examples where the application 223 includes one or more machine learning algorithms, in the training mode, classifiers, and the like, may be generated for use by the one or more machine learning algorithms to implement the functionality of the computing device 101 as described herein.

The one or more machine learning models and/or algorithms of the application 223 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public safety and/or government agency environments. Any suitable machine learning algorithm and/or deep learning algorithm and/or neural network is within the scope of present examples.

While details of the communication infrastructures 103, the communication devices 105, the base stations 111, and the call servers 113 are not depicted, such components of the system 100 are understood to have structures to the computing device 101 as depicted in FIG. 2, but adapted for their respective functionality. For example, the communication infrastructures 103 and/or the call servers 113 are configured to conduct calls; the communication devices 105 are configured to initiate and/or receive call data, and/or participate in calls; the base stations 111 are configured to relay call data (e.g. audio data, routing data, etc.) between the communication devices 105 via a communication infrastructure 103 conducting a call, etc.

Attention is now directed to FIG. 3, which depicts a flowchart representative of a method 300 for changing communication infrastructure based on call security level. The operations of the method 300 of FIG. 3 correspond to machine readable instructions that are executed by the computing device 101, and specifically the controller 220 of the computing device 101. In the illustrated example, the instructions represented by the blocks of FIG. 3 are stored at the memory 222 for example, as the application 223. The method 300 of FIG. 3 is one way in which the controller 220 and/or the computing device 101 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

Furthermore, while the method 300 will be described with respect to the call 109 being initially conducted at the first communication infrastructure 103-1, it is understood that the method 300 may be applied to any suitable call initially conducted at any suitable first communication infrastructure. Furthermore, in the following description of the method 300, it is understood that the controller 220 and/or the computing device 101 may have access to at least the audio 129 of the call 109.

At a block 302, the controller 220 and/or the computing device 101 determines (e.g. via monitoring the call 109, and/or audio 129 thereof, via the communication unit 202) a call security level of the call 109 occurring at the first communication infrastructure 103-1. As described above, the first communication infrastructure 103-1 is generally associated with a first security level 117-1. In general, the call security level is determined from one or more of; a profile of a caller 107 on the call 109; and audio 129 on the call 109.

The call security level of the call 109 may be determined in any suitable manner, and may comprise any suitable data including, but not limited to, a numeric value, and/or alphanumeric data indicative of a security policy and/or security standard that would be suitable for the audio 129 and/or profiles 119 of the callers 107 on the call 109. In the latter example, the controller 220 and/or the computing device 101 may determine that the call security level is best defined by a security protocol and/or security standard indicated by one of the security levels 117.

For example, the controller 220 and/or the computing device 101 may be generally configured to determine identifiers of the communication devices 105 participating on the call 109 and hence determine respective profiles 119 of the callers 107 participating on the call 109 (e.g. as identifiers of the communication devices 105 may be stored at the profiles 119). As described above, the profiles 119 may generally indicate an affiliation 121 of a caller 107 (e.g. agency affiliation and/or a government affiliation). Furthermore, an agency that a caller 107 is associated with may have a policy that requires their employees to participate in calls conducted on communication infrastructure that has a given security level. Hence, a call security level of the call 109, as determined by the controller 220 and/or the computing device 101, may comprise a given security level defined by a policy of an agency and/or a government agency associated with caller 107 on the call 109. Such a policy may also be stored at a profile 119 and/or stored at a database in association with an identifier of an agency.

Put another way, the controller 220 and/or the computing device 101 may be configured to determine the call security level of the call 109 from a profile 119 of a caller 107 on the call 109 based on one or more of: an agency affiliation of the caller 107, as indicated by the profile 119; a government affiliation of the caller 107, as indicated by the profile 119; and the like.

A call security level of the call 109 may change depending on the callers 107 currently on the call 109 (e.g. a call security level of the call 109 may change as callers 107 are added or dropped from the call 109). With brief reference back to FIG. 1, the callers 107-1, 107-2 may initially be on the call 109 (e.g. via the respective communication devices 105-1, 105-2) and the caller 107-3 may later join the call 109 (e.g. via the communication device 105-3). For example, one or more of the callers 107-1, 107-2 may conference the caller 107-3 into the call 109 using any suitable call conference functionality of one or more of the communication devices 105-1, 105-2 and/or the first communication infrastructure 103-1; in particular, one or more of the callers 107-1, 107-2 may operate a menu system at a respective communication device 105-1, 105-2 to call the communication device 105-3 to add the caller 107-3 to the call 109. As the agency affiliation of the caller 107-3 may indicate a higher security level than the agency affiliations of the callers 107-1, 107-2, the call security level may initially be at a given security level (e.g. defined by a respective affiliation 121-1, 121-2 of one or more of the callers 107-1, 107-2) and change to a higher security level when the caller 107-3 joins the call 109 (e.g. defined by the affiliation 121-3 of the caller 107-3). Such a higher security level may be misaligned with the security level 117-1 of the first communication infrastructure 103-1 at which the call 109 is being conducted.

In other examples, the controller 220 and/or the computing device 101 may be configured to determine the call security level of the call 109 from the audio 129 of the call 109 based on one or more: given semantics indicated in the audio 129; a given topic indicated in the audio 129; a given policy indicated in the audio 129; keywords indicated in the audio 129; and the like.

For example, the term "semantics", as described herein, may generally refer to a meaning of what a caller is saying on a call, independent of language being used by a caller, and which may be determined and/or derived and/or inferred from keywords, key phrases, idioms, orders of words, how ideas are expressed using words, and the like, used by a caller on a call. In particular, semantics on the call 109 may indicate that the callers 107 are discussing a sensitive and/or confidential topic that is incompatible with the security level 117-1 of the first communication infrastructure 103-1.

Similarly, given topics indicated in the audio 129 and/or keywords indicated in the audio 129 may indicate that the callers 107 are discussing a sensitive and/or confidential topic that is incompatible with the security level 117-1 of the first communication infrastructure 103-1.

Similarly, one or more of the callers 107 on the call 109 may mention a policy and/or a security policy (and/or security standard) that defines a given security level of communication infrastructure 103 compatible with topics to be discussed on the call 109, and which may be different from, and/or misaligned with the security level 117-1 of the first communication infrastructure 103-1.

Indeed, in each of the aforementioned examples, the audio 129 of the call 109 may indicate that the call security level of the call 109, as determined by the controller 220 and/or the computing device 101, is misaligned with the security level 117-1 of the first communication infrastructure 103-1 at which the call 109 is being conducted.

At a block 304, the controller 220 and/or the computing device 101 determines whether the call security level and the first security level are misaligned.

In some examples, the controller 220 and/or the computing device 101 may determine whether the call security level and the first security level 117-1 are misaligned by: comparing the call security level and the first security level 117-1; and determining one or more of: a difference between the call security level and the first security level 117-1; that one or more of a protocol and a standard associated the first security level 117-1 does not meet the call security level of the call 109; and the like.

For example, the call security level and the first security level 117-1 may each comprise a numeric value, and the call security level may be higher or lower than the first security level 117-1. Such a higher or lower numeric value of the call security level, as compared to a respective numeric value of the first security level 117-1, may indicate a misalignment therebetween. However, in other examples, the first security level 117-1 may comprise a range of numeric values and the numeric value of the call security level may be outside of the range of numeric values, indicating a misalignment therebetween. In other examples, the first security level 117-1 may comprise a single numeric value, and the numeric value of the call security level may be outside of a given range and/or percentage range, and the like, of the single numeric value (e.g. 25% higher or 25% lower than the single numeric value, of the first security level 117-1, though any suitable percentage value is within the scope of the present specification), indicating a misalignment therebetween. However, any suitable indication of misalignment is within the scope of the present specification.

Conversely, the numeric value of the call security level may be aligned with a respective numeric value of the first security level 117-1 when one or more of: the numeric value of the call security level and the respective numeric value of the first security level 117-1 are equal; the numeric value of the call security level is within a range of numeric values of the first security level 117-1; the numeric value of the call security level and the respective numeric value of the first security level 117-1 are within a given range and/or percentage value of each other.

However, in other examples, the call security level and the first security level 117-1 may each comprise an alphanumeric indication of a respective security protocol and/or security standard. When the respective security protocols and/or security standards, of the call security level and the first security level 117-1, do not match, the call security level and the first security level 117-1 may be misaligned; similarly, when the respective security protocols and/or security standards match, the call security level and the first security level 117-1 may be aligned. For example, the controller 220 and/or the computing device 101 may determine that the call security level is best defined by a security protocol and/or security standard defined by the second security level 117-2; as the call 109 is being conducted at the first communication infrastructure 103-1, operated according to a security protocol and/or security standard defined by the first security level 117-1, the call security level and the first security level 117-1 may be determined to be misaligned.

At a block 306, the controller 220 and/or the computing device 101, in response to determining that the call security level and the first security level are misaligned (e.g. a "YES" decision at the block 304), causes the call 109 (e.g. via the communication unit 202)) to change to a second communication infrastructure associated with a second security level aligned with the call security level.

In some examples, the call security level and the second security level are higher than the first security level 117-1. Hence, with reference back to FIG. 1, the controller 220 and/or the computing device 101 may cause the call 109 to change to one of the communication infrastructures 103-2, 103-3 with higher respective security levels 117-2, 117-3 than the first security level 117-1. For example, the controller 220 and/or the computing device 101 may cause the call 109 to change to the second communication infrastructure 103-2 when the call security level is aligned with the second security level 117-2. Alternatively, the controller 220 and/or the computing device 101 may cause the call 109 to change to the third communication infrastructure 103-3 when the call security level is aligned with the third security level 117-3. Hence, the terms "second communication infrastructure" and "second security level" of the method 300 may include any communication infrastructure 103 and respective security level 117 to which the call 109 is changed and/or moved and/or transferred.

Put another way, when the first communication infrastructure 103-1 comprises a cloud-based communication infrastructure, and the call security level of the call 109 is higher than the first security level 117-1, the second communication infrastructure of the method 300 may comprise one of: a respective cloud-based communication infrastructure (e.g. the second communication infrastructure 103-2) and a premises-based communication infrastructure (e.g. the third communication infrastructure 103-3).

However, in other examples, the call security level and the second security level, referred to at the block 306, may be lower than a first security level of communication infrastructure 103 at which the call 109 is being conducted. For example, the call 109 may initially be conducted at the second communication infrastructure 103-2 or the third communication infrastructure 103-3 operated according to respective security levels 117-2, 117-3. Hence, the terms "first communication infrastructure" and the "first security level" of the method 300 may include any communication infrastructure 103 and respective security level 117 to at which the call 109 is being conducted at the block 302. Hence, the controller 220 and/or the computing device 101 may cause the call 109 to change to a communication infrastructure 103 with a lower respective security level 117 than a security level 117 at which the call 109 is being conducted. For example, the controller 220 and/or the computing device 101 may cause the call 109 to change from the second communication infrastructure 103-2 to the first communication infrastructure 103-1 when the call security level is aligned with the first security level 117-1. Alternatively, the controller 220 and/or the computing device 101 may cause the call 109 to change from the third communication infrastructure 103-3 to the second communication infrastructure 103-2 when the call security level is aligned with the second security level 117-2; alternatively, the controller 220 and/or the computing device 101 may cause the call 109 to change from the third communication infrastructure 103-3 to the first communication infrastructure 103-1 when the call security level is aligned with the first security level 117-1.

Put another way, when the first communication infrastructure of the method 300 comprises one of a cloud-based communication infrastructure (e.g. the second communication infrastructure 103-2) and a premises-based communication infrastructure (e.g. the third communication infrastructure 103-3), and the call security level of the call 109 is lower than the first security level, the second communication infrastructure may comprises a respective cloud-based communication infrastructure (e.g. one of the communication infrastructures 103-1, 103-2).

However, the controller 220 and/or the computing device 101 may cause the call 109 to change to any suitable communication infrastructure 103, for example with a respective security level 117 that aligns and/or best aligns and/or better aligns with the call security level of the call 109.

Returning briefly to the block 304, the controller 220 and/or the computing device 101, in response to determining that the call security level and the first security level are not misaligned and/or aligned (e.g. a "NO" decision at the block 304), may repeat the block 302 to continue to determine a call security level of the call 109.

Indeed, whether or not the block 306 is implemented, the controller 220 and/or the computing device 101 may continue to implement the method 300 to determine when the call security level of the call 109 changes, and cause the call 109 to change to another communication infrastructure 103 having a respective security level 117 aligned with a current call security level.

Hence, for example, when the call security level increases, the controller 220 and/or the computing device 101, may cause the call 109 to change from the first communication infrastructure 103-1 to the second communication infrastructure 103-2, as described above, and when the call security level again increases, the controller 220 and/or the computing device 101, may cause the call 109 to change from the second communication infrastructure 103-2 to the third communication infrastructure 103-3.

Similarly, when the call security level decreases, the controller 220 and/or the computing device 101, may cause the call 109 to change from the second communication infrastructure 103-2 to the first communication infrastructure 103-1, or the controller 220 and/or the computing device 101, may cause the call 109 to change from the third communication infrastructure 103-3 to the second communication infrastructure 103-2 or the first communication infrastructure 103-1.

Hence, as the call security increases, the controller 220 and/or the computing device 101, may cause the call 109 to change to a communication infrastructure with security measures better suited to topics and/or callers 107 on the call 109; similarly, as the call security decreases, the controller 220 and/or the computing device 101, may cause the call 109 to change to a communication infrastructure that is cheaper to operate.

In some examples, the controller 220 and/or the computing device 101 may cause the call 109 to change to a second communication infrastructure associated with a second security level aligned with the call security level by: communicating with one or more of the base stations 111 to cause the one or more base stations 111 to route communications from one or more of the communication devices 105, used by one or more of the callers 107 to participate on the call 109, to the second communication infrastructure.

For example, the controller 220 and/or the computing device 101 may retrieve a network address 118 of a communication infrastructure 103 to which the call 109 is to be transferred from the database 115-1 (e.g. based on a security level 117 that aligns with the call security level, as described above), and provide the network address 118 to the base stations 111, which generally route communications (e.g. call data) of the communication devices 105 on the call 109 to a communication infrastructure 103. The base stations 111 which receive the network address 118 may then route communications for the call 109 to the received network address 118. However, any suitable process for changing the call 109 to a second communication infrastructure from a first communication infrastructure is within the scope of the present specification; for example, the network address 118 of a second communication infrastructure 103 to which the call 109 is to be transferred may be transmitted to the communication devices 105 on the call 109 and/or the network address 118 of a second communication infrastructure 103 to which the call 109 is to be transferred may be transmitted to a switch, and the like, located in the network 112.

Figure 4:
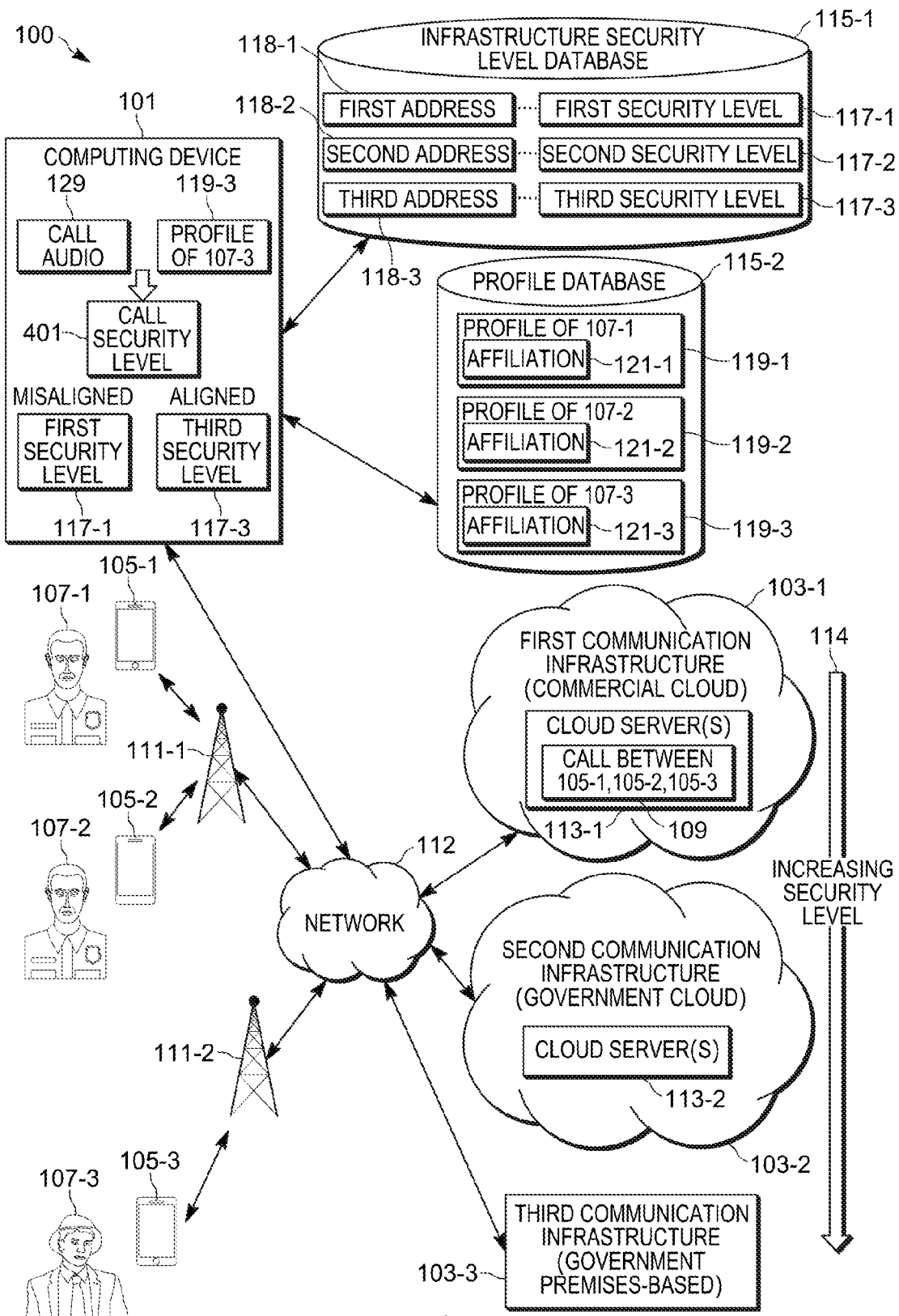
FIG. 4 depicts an example of a method for changing communication infrastructure based on call security level implemented in the system of FIG. 1, in accordance with some examples.
Figure 5:
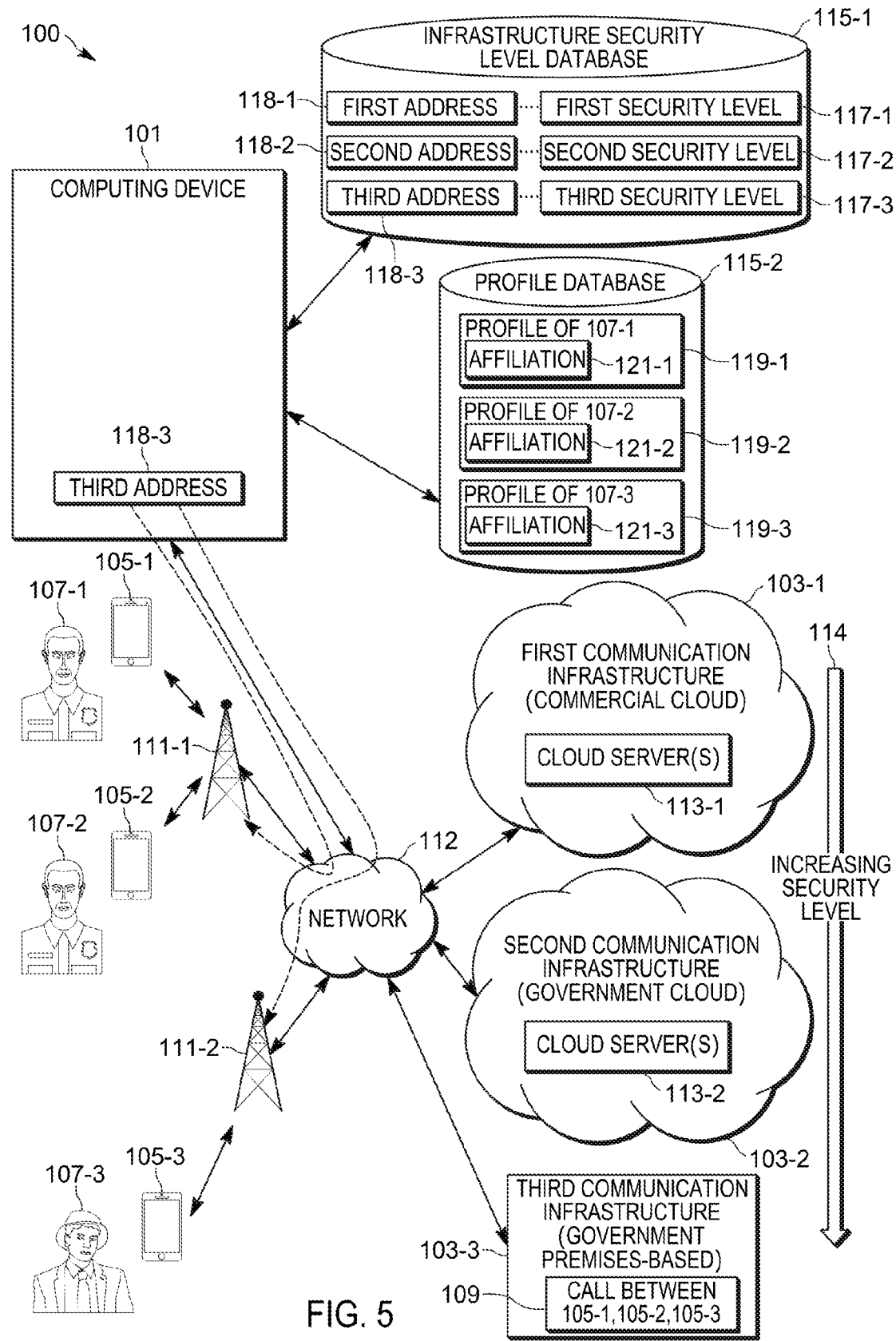
FIG. 5 continues to depict the example of the method for changing communication infrastructure based on call security level implemented in the system of FIG. 1, in accordance with some examples.
Figure 6:
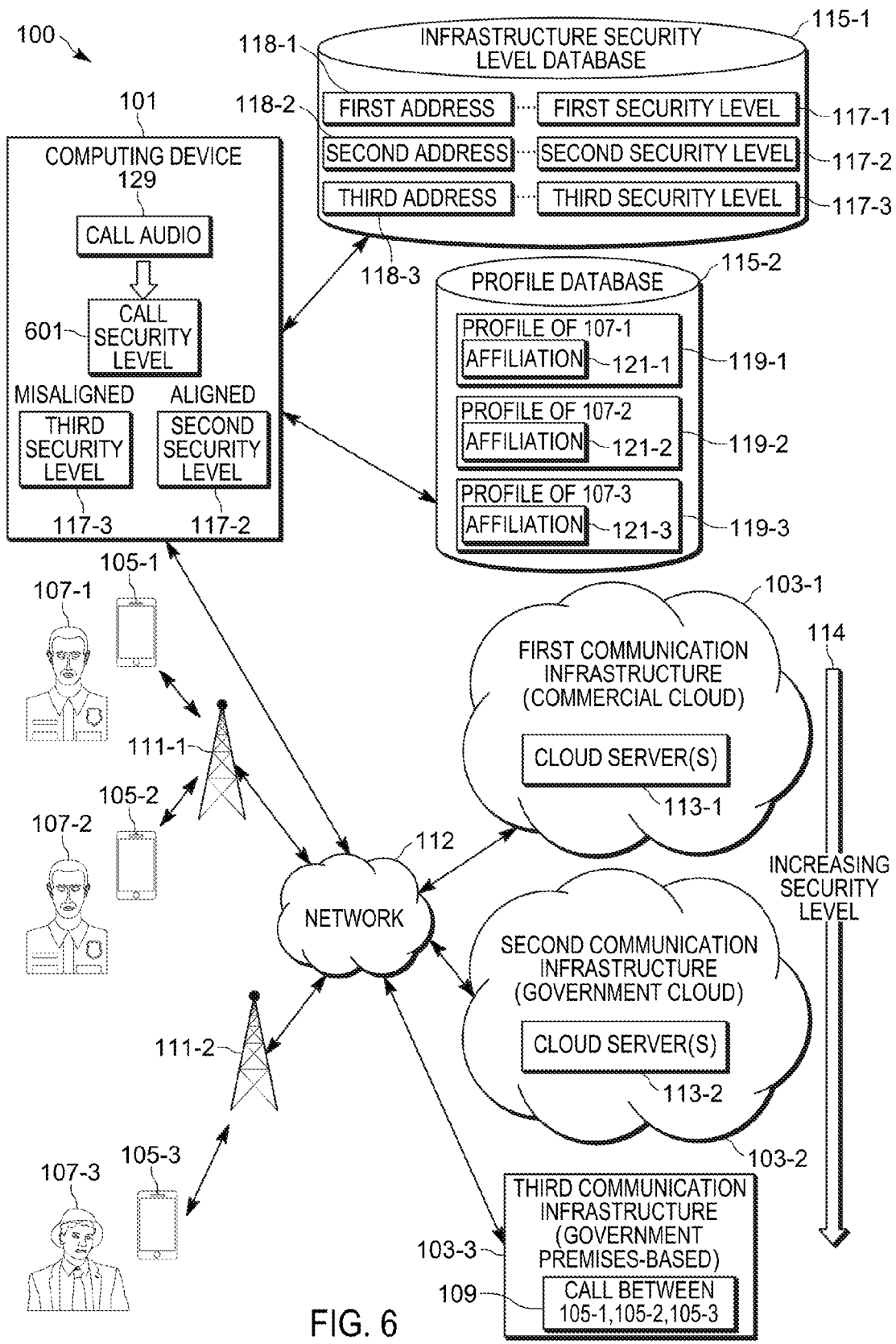
FIG. 6 continues to depict the example of the method for changing communication infrastructure based on call security level implemented in the system of FIG. 1, in accordance with some examples.

Attention is next directed to FIG. 4, FIG. 5 and FIG. 6 which depict examples of the method 300. FIG. 4, FIG. 5 and FIG. 6 are substantially similar to FIG. 1 with like components having like numbers.

With attention first directed to FIG. 4, the call 109 is being conducted at the first communication infrastructure 103-1 however, in contrast to FIG. 1, the communication device 105-3 (and/or the caller 107-3) has been added to the call 109. Hence, as depicted, a communication link has been established between the communication device 105-3 and the base station 111-2, and call data and/or communications of the call 109 is routed between the communication device 105-3 and the first communication infrastructure 103-1 via the base station 111-2. For example, the base station 111-2 may be provided with the network address 118-1 of the first communication infrastructure 103-1 to implement such routing via any suitable call conferencing process.

As also depicted in FIG. 4, the computing device 101 determines (e.g. at the block 302 of the method 300) a call security level 401 of the call 109. For example, as the caller 107-3 is added to the call 109, the computing device 101 may retrieve the profile 119-3 of the caller 107-3 from the database 115-2 and/or process the call audio 129 to determine the call security level 401. As depicted, the computing device 101 may determine (e.g. at the block 304 of the method 300) that the call security level 401 is misaligned with the first security level 117-1 of the first communication infrastructure 103-1 at which the call 109 is being conducted.

However, as also depicted, the computing device 101 may that the call security level 401 is aligned with the third security level 117-3 of the third communication infrastructure 103-3, for example due to an affiliation 121-3 of the caller 107-3 and/or due to topics being discussed on the call 109.

While not depicted, the computing device 101 may have previously determined a call security level of the call 109 prior to the third caller 107-3 being added to the call 109 and further previously determined that the call security level, when only the callers 107-1, 107-2 were participating in the call 109, was aligned with the first security level 117-1 of the first communication infrastructure 103-1 at which the call 109 is being conducted. Hence, FIG. 4 may depict that a previous call security level of the call 109 has changed to the call security level 401; put another way, a call security level of the call 109 may increase to the call security level 401 when the caller 107-3 is added to the call 109.

Attention is next directed to FIG. 5, which depicts the computing device 101, in response to determining that the call security level 401 is misaligned with the first security level 117-1, causing (e.g. at the block 306 of the method 300) the call 109 to change to the third communication infrastructure 103-3 associated with the third security level 117-3 aligned with the call security level 401. For example, as depicted, the computing device 101 transmits the third address 118-3 of the third communication infrastructure 103-3 to the base stations 111 to cause the base stations 111 to route communications and/or call data of the call 109 to the third communication infrastructure 103-3. As depicted, the call 109 has changed to the third communication infrastructure 103-3. The transmission of the third address 118-3 to the base stations 111 is depicted in dashed lines to distinguish from the communication links along which the transmission occurs (e.g. via the network 112).

Attention is next directed to FIG. 6, at which the computing device 101 continues to determine (e.g. at the block 302 of the method 300) a current call security level of the call 109. In particular, due to topics being discussed on the call 109, and the like, the current call security level of the call 109 may change to a call security level 601 which is misaligned with the third security level 117-3 of the third communication infrastructure 103-3 at which the call 109 is being conducted, but aligned with the second security level 117-2 of the second communication infrastructure 103-2. Put another way, as compared to the example depicted in FIG. 4 and FIG. 5, the call security level 401 may decrease to the call security level 601. For example, in FIG. 4 and FIG. 5 the callers 107 may be discussing a matter of national security, as indicated by the call audio 129, and the callers 107 may then change to discussing where they might eat lunch. Hence, the current call security level decreases.

Figure 7:
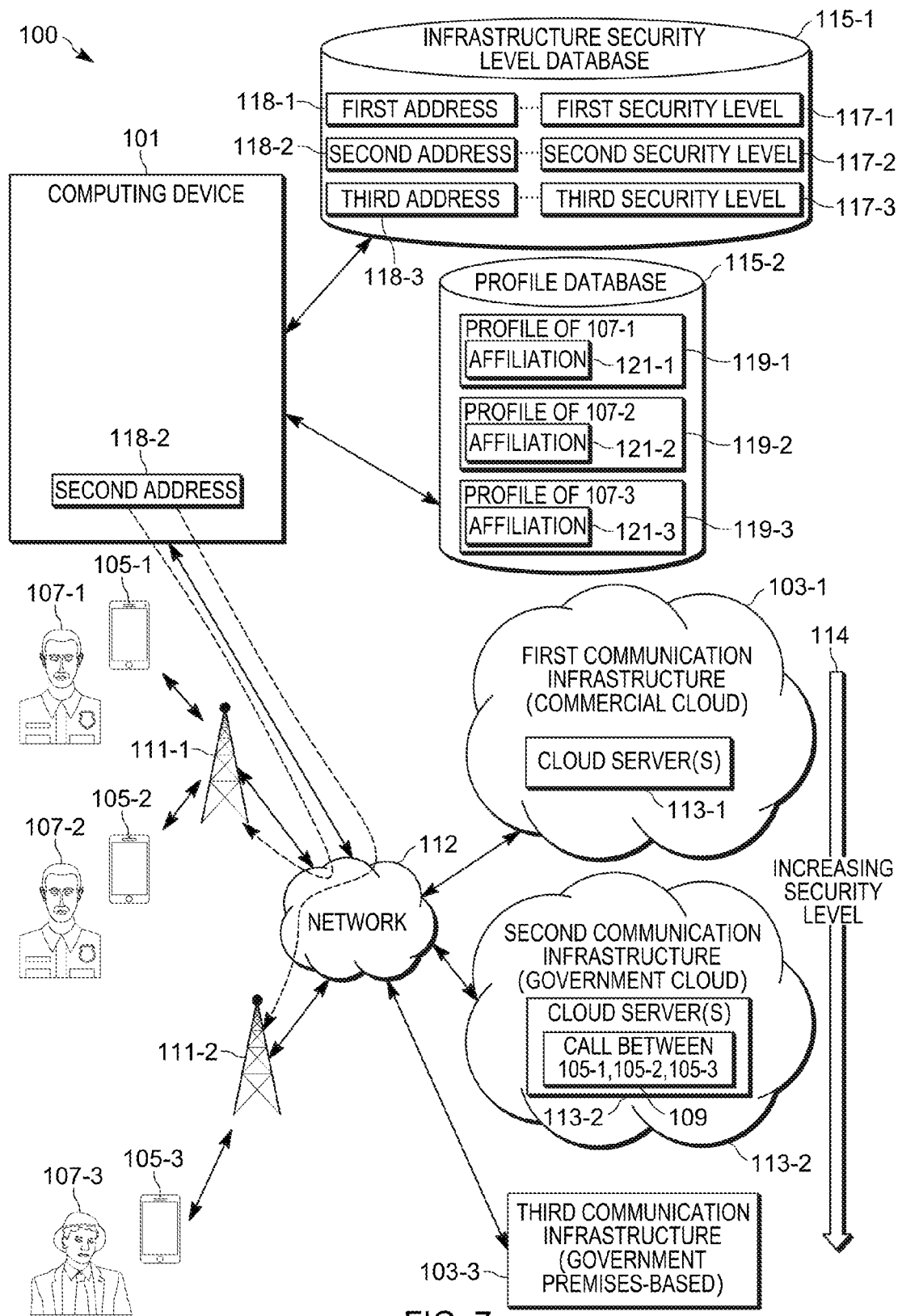
FIG. 7 continues to depict the example of the method for changing communication infrastructure based on call security level implemented in the system of FIG. 1, in accordance with some examples.

Attention is next directed to FIG. 7, which depicts the computing device 101, in response to determining that the call security level 401 is misaligned with the third security level 117-3, causing (e.g. at the block 306 of the method 300) the call 109 to change to the second communication infrastructure 103-2 associated with the second security level 117-2 aligned with the call security level 601. For example, as depicted, the computing device 101 transmits the second address 118-2 of the second communication infrastructure 103-2 to the base stations 111 to cause the base stations 111 to route communications and/or call data of the call to the second communication infrastructure 103-2. As depicted, the call 109 has changed to the second communication infrastructure 103-2.

The computing device 101 may continue to monitor the call 109 and cause the call 109 to change between the communication infrastructures 103 as callers 107 are added to, and/or dropped from, the call 109, and/or as topics, etc. of the call 109 change thereby increasing security of the call 109, or decreasing cost of the call 109.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method comprising:
   determining, at a computing device, a call security level of a call occurring at a first communication infrastructure; the first communication infrastructure associated with a first security level; the call security level determined from one or more of: a profile of a caller on the call; and audio on the call; and
   in response to determining that the call security level and the first security level are misaligned, causing, via the computing device, the call to change to a second communication infrastructure associated with a second security level aligned with the call security level,
   wherein determining the call security level from the audio on the call is based on one or more:
      given semantics indicated in the audio;
      a given topic indicated in the audio;
      a given policy indicated in the audio; and
      keywords indicated in the audio.

2. The method of claim 1, wherein determining the call security level from the profile of the caller on the call is based on one or more of:
   an agency affiliation of the caller, as indicated by the profile; and
   a government affiliation of the caller, as indicated by the profile.

3. The method of claim 1, wherein the call security level and the second security level are higher than the first security level.

4. The method of claim 1, wherein the call security level and the second security level are lower than the first security level.

5. The method of claim 1, wherein, when the first communication infrastructure comprises a cloud-based communication infrastructure, and the call security level is higher than the first security level, the second communication infrastructure comprises one of: a respective cloud-based communication infrastructure and a premises-based communication infrastructure.

6. The method of claim 1, wherein, when the first communication infrastructure comprises one of a cloud-based communication infrastructure and a premises-based communication infrastructure, and the call security level is lower than the first security level, the second communication infrastructure comprises a respective cloud-based communication infrastructure.

7. The method of claim 1, wherein causing the call to change to the second communication infrastructure associated with the second security level aligned with the call security level comprises: communicating with one or more base stations to cause the one or more base stations to route communications from one or more communication devices, used by one or more callers to participate on the call, to the second communication infrastructure.

8. The method of claim 1, wherein determining that the call security level and the first security level are misaligned comprises:
   comparing the call security level and the first security level; and
   determining one or more of:
      a difference between the call security level and the first security level; and
      a variation between the call security level and the first security level.

9. The method of claim 1, further comprising: when the call security level changes, causing the call to change to another communication infrastructure having a respective security level aligned with a current call security level.

10. A device comprising:
    a communication unit;
    a hardware processor; and
    a non-transitory computer-readable storage medium having stored thereon program instructions that, when at least partially executed by the hardware processor, cause the controller to:
       determine, via the communication unit, a call security level of a call occurring at a first communication infrastructure; the first communication infrastructure associated with a first security level; the call security level determined from one or more of: a profile of a caller on the call; and audio on the call; and in response to determining that the call security level and the first security level are misaligned, cause, via the communication unit, the call to change to a second communication infrastructure associated with a second security level aligned with the call security level, wherein the hardware processor is further configured to determine the call security level from the audio on the call based on one or more:

given semantics indicated in the audio;
a given topic indicated in the audio;
a given policy indicated in the audio; and
keywords indicated in the audio.

11. The device of claim 10, wherein the program instructions further cause the hardware processor to determine the call security level from the profile of the caller on the call based on one or more of:

an agency affiliation of the caller, as indicated by the profile; and
a government affiliation of the caller, as indicated by the profile.

12. The device of claim 10, wherein the call security level and the second security level are higher than the first security level.

13. The device of claim 10, wherein the call security level and the second security level are lower than the first security level.

14. The device of claim 10, wherein, when the first communication infrastructure comprises a cloud-based communication infrastructure, and the call security level is higher than the first security level, the second communication infrastructure comprises one of: a respective cloud-based communication infrastructure and a premises-based communication infrastructure.

15. The device of claim 10, wherein, when the first communication infrastructure comprises one of a cloud-based communication infrastructure and a premises-based communication infrastructure, and the call security level is lower than the first security level, the second communication infrastructure comprises a respective cloud-based communication infrastructure.

16. The device of claim 10, wherein the program instructions further cause the hardware processor to cause the call to change to the second communication infrastructure associated with the second security level aligned with the call security level by: communicating with one or more base stations to cause the one or more base stations to route communications from one or more communication devices, used by one or more callers to participate on the call, to the second communication infrastructure.

17. The device of claim 10, wherein the program instructions further cause the hardware processor to determine that the call security level and the first security level are misaligned by:

comparing the call security level and the first security level; and
determining one or more of:
a difference between the call security level and the first security level; and
a variation between the call security level and the first security level.

18. The device of claim 10, wherein the program instructions further cause the hardware processor to: when the call security level changes, cause the call to change to another communication infrastructure having a respective security level aligned with a current call security level.

\* \* \* \* \*